Nov. 30, 1926.

J. W. COX 1,608,492

ADJUSTABLE INSERT

Filed April 17, 1925

Inventor
John W. Cox
By
Attorney

Patented Nov. 30, 1926.

1,608,492

UNITED STATES PATENT OFFICE.

JOHN WILLIAM COX, OF ERIE, PENNSYLVANIA, ASSIGNOR TO ERIE MALLEABLE IRON COMPANY, OF ERIE, PENNSYLVANIA, A CORPORATION OF PENNSYLVANIA.

ADJUSTABLE INSERT.

Application filed April 17, 1925. Serial No. 23,995.

In placing concrete where it is desired to secure devices to the concrete surface adjustable inserts have been provided so that the securing bolt can be more readily placed with relation to devices to be secured. The present invention is designed to simplify such construction. Details and features of the invention will appear from the specification and claims.

The invention is illustrated in the accompanying drawings as follows:—

Figure 1:
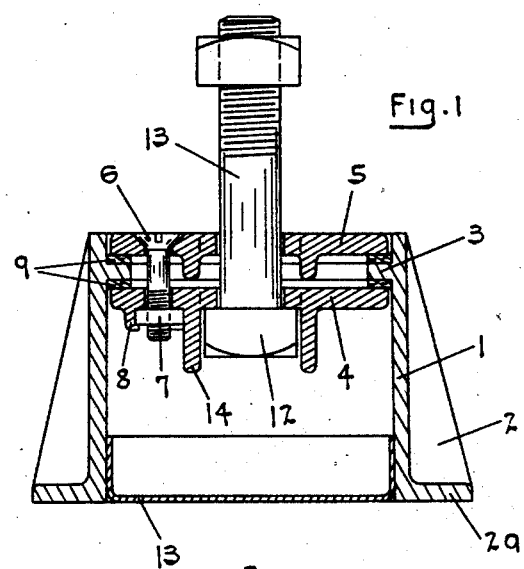
Figure 2:
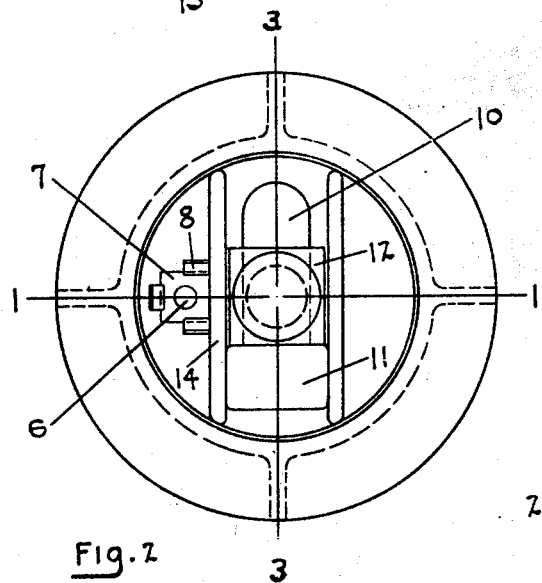

Fig. 1 shows a central section through the device on the line 1—1 in Fig. 2.

Fig. 2 a plan view of the device with the closure cap removed.

Figure 3:
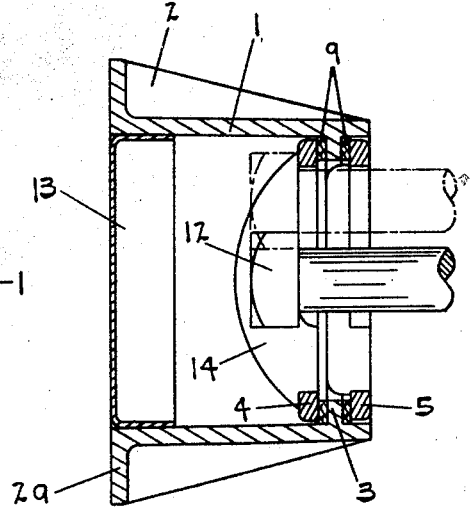

Fig. 3 a section on the line 3—3 of Fig. 2.

1 marks the supporting shell. This is ordinarily ribbed at 2 so as to strengthen the shell and improve its engagement with the surrounding cement. It is also usually provided with a flange 2ª for the same purpose.

The shell has an internal shoulder 3. Plates 4 and 5 are arranged at opposite sides of the shell 3 and these plates are secured together by a clamping screw 6 which extends through the plates and into a nut 7, the screw being preferably from the outside of the outside plate. In order that the screw may be readily put in place the nut 7 in which the screw operates is secured to the plate 4 by lugs 8, the plate being ordinarily cast of malleable metal so that these lugs 8 may be headed over on to the nut, thus locking it in place on the plate.

I prefer to provide packing rings 9 between the plates and the shell 3. This is particularly desirable where the device supported is such as to be subjected to jar.

The plates 4 and 5 are provided with similar T slots 10, the end 11 of the slots being of sufficient size to receive a head 12 of a bolt 13, the bolt being tipped down edgewise so as to permit the insertion of the head through the end 11 and the bolt is then brought upright with the head along the slot 10.

In order to prevent the bolt turning I provide the guide lips 14 along the slot 10 so that the bolt head as it is moved along the slot is locked against turning.

With this device placed in the concrete at approximately the desired position for the bolt, the bolt may be adjusted within the limits of the slot 10 so as to take up any irregularities. If the line of the slot 10 is not in the right direction to afford a ready adjustment of the bolt the screw 6 is loosened and the plates 4 and 5 turned to bring the slot 10 in such a direction as to permit of the adjustment of the bolt as desired.

What I claim as new is:—

1. In an adjustable insert, the combination of a supporting shell with an internal shoulder; plates above and below the shoulder having T-slots; and means for securing the plates together.

2. In an adjustable insert, the combination of a supporting shell with an internal shoulder; plates above and below the shoulder having T-slots; and clamping plates on the shoulder.

3. In an adjustable insert, the combination of a supporting shell with an internal shoulder; plates above and below the shoulder having T-slots; means securing the plates together; and packing rings between the plates and the shoulder.

4. In an adjustable insert, the combination of a supporting shell with an internal shoulder; plates above and below the shoulder having T-slots; and clamping plates on the shoulder comprising a screw, and a nut secured and locked on the inner plate.

5. In an adjustable insert, the combination of a supporting shell with an internal shoulder; plates above and below the shoulder having T-slots; means for securing the plates together; and a locking rib on the inner plate adjacent to the slot.

6. In an adjustable insert, the combination of a supporting shell with an internal shoulder; plates above and below the shoulder having T-slots; means for securing the plates together; and locking ribs on the inner plate at each side of the slot.

7. In an adjustable insert, the combination of a supporting shell with an internal shoulder; plates above and below the shoulder having T-slots; means for securing the plates together; and a closure plate on the rear of the shell.

In testimony whereof I have hereunto set my hand.

JOHN WILLIAM COX.